United States Patent
Naito et al.

(10) Patent No.: US 9,959,980 B2
(45) Date of Patent: May 1, 2018

(54) SOLID ELECTROLYTIC CAPACITOR ELEMENT AND METHOD FOR MANUFACTURING SOLID ELECTROLYTIC CAPACITOR ELEMENT

(71) Applicant: SHOWA DENKO K.K., Tokyo (JP)

(72) Inventors: Kazumi Naito, Tokyo (JP); Shoji Yabe, Tokyo (JP)

(73) Assignee: Showa Denko K.K., Tokyo (JP)

( * ) Notice: Subject to any disclaimer, the term of this patent is extended or adjusted under 35 U.S.C. 154(b) by 36 days.

(21) Appl. No.: 14/963,141

(22) Filed: Dec. 8, 2015

(65) Prior Publication Data

US 2016/0163466 A1    Jun. 9, 2016

(30) Foreign Application Priority Data

Dec. 9, 2014 (JP) .................................. 2014-248882

(51) Int. Cl.
| | |
|---|---|
| *H01G 9/15* | (2006.01) |
| *H01G 9/00* | (2006.01) |
| *H01G 9/028* | (2006.01) |
| *H01G 9/042* | (2006.01) |

(52) U.S. Cl.
CPC ............ *H01G 9/15* (2013.01); *H01G 9/0036* (2013.01); *H01G 9/028* (2013.01); *H01G 9/0425* (2013.01)

(58) Field of Classification Search
CPC ........ H01G 9/15; H01G 9/0425; H01G 9/028; H01G 9/0036
See application file for complete search history.

(56) References Cited

U.S. PATENT DOCUMENTS

| | | | | |
|---|---|---|---|---|
| 6,128,180 | A  * | 10/2000 | Araki ..................... | H01G 9/15 |
|  |  |  |  | 361/524 |
| 6,244,639 | B1 * | 6/2001 | Storck ..................... | B63C 9/32 |
|  |  |  |  | 294/25 |
| 9,318,268 | B2 * | 4/2016 | Onoue ................... | H01G 9/028 |
| 2002/0015279 | A1 * | 2/2002 | Sakai .................. | H01G 9/0036 |
|  |  |  |  | 361/523 |
| 2008/0266756 | A1 * | 10/2008 | Fujita .................. | H01G 9/0029 |
|  |  |  |  | 361/523 |

(Continued)

FOREIGN PATENT DOCUMENTS

| | | |
|---|---|---|
| JP | 2003-213302 | 7/2003 |
| JP | 2004-349658 | 12/2004 |

(Continued)

*Primary Examiner* — David M Sinclair
(74) *Attorney, Agent, or Firm* — Knobbe, Martens, Olson & Bear, LLP

(57) ABSTRACT

Disclosed is a solid electrolytic capacitor element including a dielectric layer, a first conductive polymer semiconductor layer, a second conductive polymer semiconductor layer and a conductor layer, formed in that order, on a tungsten anode body having an externally protruding lead wire, and the thickness of the thickest portion of the second conductive polymer semiconductor layer on the lower surface opposite the upper surface from which the lead wire protrudes is thinner than the thickness of the thickest portion of the second conductive polymer semiconductor layer on the side surfaces, and the thickness of the second conductive polymer semiconductor layer on the lower surface is greater than 2 μm and less than 15 μm.

6 Claims, 1 Drawing Sheet

(56) References Cited

U.S. PATENT DOCUMENTS

| | | | | |
|---|---|---|---|---|
| 2012/0218682 A1* | 8/2012 | Komatsu | ............. | H01G 9/0036 361/523 |
| 2013/0083455 A1* | 4/2013 | Takahashi | ................ | H01G 9/15 361/528 |
| 2013/0277626 A1* | 10/2013 | Naito | ................... | B22F 1/0096 252/515 |
| 2014/0055912 A1* | 2/2014 | Onoue | ................... | H01G 9/028 361/525 |
| 2014/0063691 A1* | 3/2014 | Kosuge | ................. | H01G 9/025 361/525 |

FOREIGN PATENT DOCUMENTS

| | | | | |
|---|---|---|---|---|
| JP | 2013-074282 | | 4/2013 | |
| JP | WO 2013080617 A1 * | | 6/2013 | ............... B22F 9/04 |

* cited by examiner

SOLID ELECTROLYTIC CAPACITOR ELEMENT AND METHOD FOR MANUFACTURING SOLID ELECTROLYTIC CAPACITOR ELEMENT

CROSS-REFERENCE TO RELATED APPLICATIONS

This application claims priority to Japanese Patent Application No. 2014-248882 filed on Dec. 9, 2014, the disclosure of which including the specification, the drawings, and the claims is hereby incorporated by reference in its entirety.

BACKGROUND OF THE INVENTION

Field of the Invention

The present invention relates to a solid electrolytic capacitor element, and a method for manufacturing a solid electrolytic capacitor and a solid electrolytic capacitor element.

Priority is claimed on Japanese Patent Application No. 2014-248882, filed Dec. 9, 2014, the content of which is incorporated herein by reference.

Description of Related Art

Solid electrolytic capacitor elements are composed of an anode body formed from a conductor such as a sintered body of a valve action metal powder, a dielectric layer of a metal oxide formed on the surface of the anode body by subjecting the surface of the anode body to electrolytic oxidation in an aqueous solution of an electrolyte such as phosphoric acid, and a cathode formed from a conductive polymer semiconductor layer of a conductive polymer formed on the dielectric layer by electrolytic polymerization or the like and a conductor layer formed on the conductive polymer semiconductor layer.

Examples of known methods for forming the conductive polymer semiconductor layer include methods using a low-viscosity polymerization solution such as a chemical polymerization method or an electrolytic polymerization method, and methods in which the anode body that has been coated with the dielectric layer is dipped in a high-viscosity conductive polymer dispersion. Using a low-viscosity solution is superior in terms of enabling the semiconductor layer to be formed even within very confined portions of the porous structure of the anode body, but also suffers some problems, including a low density for the formed semiconductor layer, and a potential increase in short circuits and the leakage current (LC). On the other hand, using a high-viscosity conductive polymer dispersion is superior in terms of enabling the formation of a high-density semiconductor layer, but suffers from different problems, including an inability to form the conductive polymer semiconductor layer in very confined portions, and an inability to obtain satisfactory adhesion.

In order to address these problems, Patent Document 1 discloses a method in which the conductive polymer semiconductor layer is formed as two layers, using a low-viscosity solution for forming the first conductive polymer semiconductor layer, and using a high-viscosity solution for forming the second conductive polymer semiconductor layer.

In recent years, in order to enhance the performance of solid electrolytic capacitors, investigations have also been conducted into the valve action metal used for the anode body. For example, Patent Document 2 discloses a solid electrolytic capacitor which uses a sintered body of a tungsten powder for the anode body. A solid electrolytic capacitor which uses a sintered body of a tungsten powder for the anode body is able to manufacture a larger capacitance than solid electrolytic capacitors which use sintered bodies of other valve action metals. However, cracking of the dielectric coating during the chemical conversion step, and a large leakage current tend to be problematic, and investigations are ongoing.

SUMMARY OF THE INVENTION

Solid electrolytic capacitors which use an anode body containing tungsten as the main component (hereafter referred to as a "tungsten anode body") are still at the stage of being the subject of ongoing investigations, and the difficulty associated with satisfactorily suppressing the leakage current is proving problematic.

As a part of intensive investigations, the inventors of the present invention investigated the formation of conductive polymer semiconductor layers having the type of two-layer structure mentioned above within solid electrolytic capacitors which use a sintered body of a tungsten powder for the anode body.

However, when a conductive polymer semiconductor layer having the type of two-layer structure described above was actually formed on a tungsten anode body, a problem arose in that the conductive polymer semiconductor layer (and particularly the second conductive polymer semiconductor layer) was prone to cracking or splitting, and the leakage current was unable to be suppressed satisfactorily. The surface opposite the surface from which the lead wire protruded was particularly prone to cracking, and the leakage current was significant. The inventors of the present invention were the first to encounter this problem when employing the above layer configuration on a tungsten anode body. In Patent Document 1, the materials described for the anode body were aluminum or tantalum, and it is clear that the above problem was not encountered.

The present invention has been developed in light of the above circumstances, and has an object of providing a solid electrolytic capacitor element and a solid electrolytic capacitor in which cracking and splitting of the conductive polymer semiconductor layer is reduced, and the leakage current can be satisfactorily suppressed even when a tungsten anode body is used.

As a result of intensive investigation, the inventors of the present invention noticed that when an anode body containing tungsten as the main component was used, a large amount of hydrogen gas was generated during chemical conversion and during post-conversion, compared with those cases where a more widely used anode body containing aluminum or tantalum as the main component was used. Generally, even if the first conductive polymer semiconductor layer is formed by a chemical polymerization method and/or an electrolytic polymerization method, and even if the second conductive polymer semiconductor layer is formed by adhesion of a conductive polymer dispersion and subsequent solidification, both layers have gaps that are large enough for gas to permeate through, meaning any generated hydrogen gas can permeate through the layers. However, it is thought that if the conductive polymer semiconductor layer is not thin enough for the amount of hydrogen gas being generated, then the hydrogen gas is unable to escape (permeate through the interior of the conductive polymer semiconductor layer) at sufficient speed, resulting in cracking of the conductive polymer semiconductor layer. It is thought that because the second conductive polymer semiconductor layer is formed with comparatively high density, it is particularly prone to cracking or splitting.

As a result of intensive investigation, the inventors of the present invention found out that, during the manufacturing process, by controlling the thickness of the second conductive polymer semiconductor layer formed on the surface (hereafter referred to as the "lower surface") on which the conductive polymer semiconductor layer is generally formed with a greater thickness than other surfaces and which is disposed opposite the surface (hereafter referred to as "the upper surface") from which the lead wire protrudes, cracking and splitting of the conductive polymer semiconductor layer could be reduced, and even when a tungsten anode body was used, a solid electrolytic capacitor element and a solid electrolytic capacitor could be obtained in which the leakage current was satisfactorily suppressed.

Further, the inventors also discovered that in the process for forming the second conductive polymer semiconductor layer, by removing liquid accumulation on the lower surface, the thickness of the formed second conductive polymer semiconductor layer could be controlled, thus providing a method for manufacturing a solid electrolytic capacitor element that enabled satisfactory suppression of the leakage current.

In other words, the present invention includes the aspects described below.

(1) A solid electrolytic capacitor element according to one aspect of the present invention includes a dielectric layer, a first conductive polymer semiconductor layer, a second conductive polymer semiconductor layer and a conductor layer, formed in that order, on an anode body containing tungsten as the main component and having a protruding lead wire, wherein the thickness of the thickest portion of the second conductive polymer semiconductor layer on the lower surface opposite the upper surface from which the lead wire protrudes is thinner than the thickness of the thickest portion of the second conductive polymer semiconductor layer on the side surfaces, and the thickness of the second conductive polymer semiconductor layer on the lower surface is greater than 2 µm and less than 15 µm.

(2) In the solid electrolytic capacitor element disclosed above in (1), the thickness of the thickest portion of the second conductive polymer semiconductor layer on the lower surface may be thicker than the average thickness of the first conductive polymer semiconductor layer on the lower surface.

(3) A solid electrolytic capacitor according to another aspect of the present invention includes the solid electrolytic capacitor element disclosed above in (1) or (2).

(4) A method for manufacturing a solid electrolytic capacitor element according to yet another aspect of the present invention is a method for manufacturing a solid electrolytic capacitor element having a dielectric layer, a first conductive polymer semiconductor layer, a second conductive polymer semiconductor layer and a conductor layer, formed in that order, on a tungsten anode body containing tungsten as the main component and having a protruding lead wire, wherein the formation step for the second conductive polymer semiconductor layer includes a step of adhering a conductive polymer dispersion to the surface of the first conductive polymer semiconductor layer, with the surface from which the lead wire protrudes disposed as the upper surface, a step of removing liquid accumulation of the adhered conductive polymer dispersion generated on a lower surface opposite the upper surface, and a step of solidifying the conductive polymer dispersion from which the liquid accumulation is removed, and the thickness of the second conductive polymer semiconductor layer on the lower surface is greater than 2 µm and less than 15 µm.

(5) In the method for manufacturing a solid electrolytic capacitor element disclosed above in (4), the first conductive polymer semiconductor layer may be formed by using a chemical polymerization method and/or an electrolytic polymerization method.

In the solid electrolytic capacitor element and the solid electrolytic capacitor according to one aspect of the present invention, by controlling the thickness of the second conductive polymer semiconductor layer on the lower surface, cracking and splitting of the conductive polymer semiconductor layer is reduced, and the leakage current can be satisfactorily suppressed even when a tungsten anode body is used.

In the method for manufacturing a solid electrolytic capacitor element according to one aspect of the present invention, by removing liquid accumulation that generates on the lower surface, the thickness of the formed second conductive polymer semiconductor layer can be controlled, enabling the leakage current to be satisfactorily suppressed.

DETAILED DESCRIPTION OF THE INVENTION

A solid electrolytic capacitor element and a solid electrolytic capacitor according to the present invention are described below in detail with appropriate reference to the drawings.

The drawings used in the following description may be drawn with specific portions enlarged as appropriate to facilitate comprehension of the features of the present invention, and the dimensional ratios and the like between the various constituent elements may differ from the actual values. Further, the materials and dimensions and the like presented in the following descriptions are merely descriptions, which in no way limit the present invention, and may be altered as appropriate within the scope of the present invention.

Solid Electrolytic Capacitor Element

Figure 1:
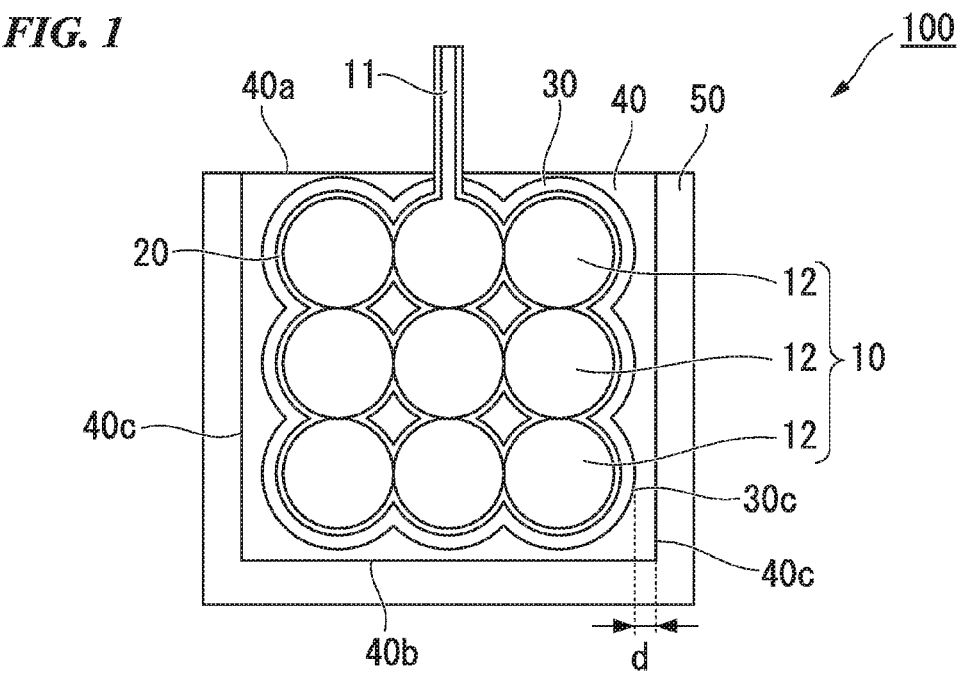
FIG. 1 is a schematic cross-sectional view schematically illustrating a solid electrolytic capacitor element according to an embodiment of the present invention.

FIG. 1 is a schematic cross-sectional view of a solid electrolytic capacitor element according to an embodiment of the present invention.

The solid electrolytic capacitor element 100 according to one aspect of the present invention has a dielectric layer 20, a first conductive polymer semiconductor layer 30, a second conductive polymer semiconductor layer 40 and a conductor layer 50, formed in that order, on an anode body containing tungsten as the main component (a tungsten anode body) 10 and having an externally protruding lead wire 11. Further, the thickness of the thickest portion of the second conductive polymer semiconductor layer 40 on a lower surface 40b opposite an upper surface 40a from which the lead wire 11 protrudes is thinner than the thickness of the thickest portion of the second conductive polymer semiconductor layer 40 on side surfaces 40c, and the thickness of the second conductive polymer semiconductor layer 40 on the lower surface 40b is greater than 2 µm and less than 15 µm. During the manufacturing process, because the second conductive polymer semiconductor layer 40 is formed with the surface from which the lead wire 11 protrudes disposed as the upper surface, the aforementioned "lower surface 40b opposite the upper surface 40a from which the lead wire 11 protrudes" is also the lower surface during the manufacturing process, and is the surface on which the second conductive polymer semiconductor layer 40 is formed with the greatest thickness if the treatment described in the present invention is not performed. In other words, the expression that "the thickness of the second conductive polymer semiconductor layer 40 on the lower surface 40b opposite the upper surface 40a from which the lead wire 11 protrudes is greater than 2 µm and less than 15 µm" means that the thickness of the thinnest portion of the second conductive polymer semiconductor layer 40 on the lower surface 40b is greater than 2 µm, whereas the thickness of the thickest portion is less than 15 µm. Further, during the manufacturing process, the second conductive polymer semiconductor layer 40 on the side surfaces 40c relative to the upper surface 40a from which the lead wire 11 protrudes tends to be formed with increasing thickness from the side of the upper surface 40a toward the side of the lower surface 40b.

As described below, the second conductive polymer semiconductor layer is typically formed by adhering (by dipping-pulling or application) a conductive polymer dispersion, and therefore if manufacturing is not performed with the lead wire 11 on the upper surface, then there is a possibility that a conductive polymer semiconductor layer may be formed over the entire surface of the lead wire. Ensuring that a portion of the lead wire 11 remains bare enables conduction to be guaranteed, and therefore ensuring that the lower surface 40b opposite the upper surface 40a from which the lead wire 11 protrudes becomes the lower surface during the manufacturing process is typical in this technical field.

The conductive polymer semiconductor layer formed by adhering the conductive polymer dispersion is generally formed thickly. By forming this layer thickly, and generating a dense and solid layer, the conductivity can be better ensured. Further, other effects such as reducing shock during sealing with an exterior resin, and reducing potential damage to the dielectric layer from external impacts once the capacitor product has been manufactured can also be expected. The thickness is generally at least several µm, and is preferably more than 10 µm. However, as described below, when manufacturing a solid electrolytic capacitor element using a tungsten anode body in accordance with the present invention, considerable care must be taken regarding the thickness of the second conductive polymer semiconductor layer 40 formed on the lower surface 40b.

The tungsten anode body 10 is an anode body that contains tungsten as the main component. A body in which the lead wire 11 is provided in a sintered body prepared by molding and sintering a tungsten powder can be used as the tungsten anode body. The tungsten powder may be any powder containing tungsten as the main component. Here, the expression "tungsten as the main component" means that tungsten represents at least 90% by mass of the total mass of the powder. Further, the tungsten anode body 10 may be partially silicified.

The tungsten anode body 10 may have a substantially rectangular parallelepiped shape, or a rectangular parallelepiped shape in which the corners of arbitrary surfaces have been chamfered to produce rounded corners. Further, the lead wire 11 is planted in, or connected to, one surface of the tungsten anode body 10.

Commercially available products may be used as the raw material tungsten powder. A tungsten powder having a small particle size is preferable, and a tungsten powder of smaller particle size can be obtained, for example, by grinding a tungsten oxide powder under a hydrogen atmosphere. Further, the tungsten powder may also be obtained by reducing tungstic acid or a salt thereof (such as ammonium tungstate) or a tungsten halide using a reducing agent such as hydrogen or sodium, with appropriate selection of the reduction conditions. Moreover, the tungsten powder can also be obtained from a tungsten-containing mineral, either directly or via a plurality of steps, by appropriate selection of the reduction conditions.

The raw material tungsten powder has a 50% particle size (D50) in a volume-based cumulative particle size distribution that is preferably within a range from 0.1 to 1 µm. The tungsten powder may be a non-granulated powder (hereafter also referred to as a "primary powder") or a granulated powder that has undergone granulation. The use of a granulated powder is preferable, as it facilitates the formation of pores in the capacitor anode body. Further, the granulated powder may be a powder in which the pore distribution has been adjusted, for example using the same method as that disclosed in Japanese Unexamined Patent Application, First Publication No. 2003-213302 for a niobium powder.

A powder in which either one or both of tungsten carbide and tungsten boride exist on a portion of the surfaces of the particles 12 that constitute the tungsten powder can also be used favorably as the tungsten powder. Further, a powder containing nitrogen on a portion of the surfaces of the tungsten powder particles 12 can also be used favorably.

The dielectric layer 20 is formed on the surface of the tungsten anode body 10 by a chemical conversion treatment. The "surface of the tungsten anode body 10" means the exterior surface of the tungsten anode body 10 and the surfaces of internal pores in the tungsten anode body 10, and the dielectric layer is formed on these surfaces. In other words, the dielectric coating is formed on both the exterior surface of the tungsten anode body and the surfaces of the internal pores inside the tungsten anode body.

The dielectric layer 20 is manufactured by oxidizing a portion of the tungsten anode body 10 via a chemical conversion treatment, and contains tungsten oxide ($WO_3$). Provided the dielectric layer 20 contains an amount of tungsten oxide that does not impair the capacitor characteristics, the layer may also include other compounds.

The first conductive polymer semiconductor layer 30 contains at least a conductive polymer. The first conductive polymer semiconductor layer 30 can be prepared using conventional methods, and is preferably prepared using a chemical polymerization method and/or an electrolytic polymerization method. By forming the first conductive polymer semiconductor layer 30 using a chemical polymerization method and/or an electrolytic polymerization method, the first conductive polymer semiconductor layer can be formed as a comparatively thin layer, with a substantially even thickness on even very confined portions of the tungsten anode body.

The average thickness of the first conductive polymer semiconductor layer 30 is preferably within a range from 0.5 to 5 µm. Provided the average thickness of the first conductive polymer semiconductor layer 30 satisfies this range, the semiconductor is formed even in very confined portions of the tungsten anode body, and therefore the adhesion to the dielectric layer 20 can be improved.

The thickness of the first conductive polymer semiconductor layer can be confirmed by preparing a fractured surface sample of the solid electrolytic capacitor element 100, and inspecting a scanning electron microscope (SEM) image of a cross-section of the sample. The average thickness of the first conductive polymer semiconductor layer 30 on the exterior surface of the tungsten anode body can be determined by measuring the thickness of the first conductive polymer semiconductor layer 30 at 10 randomly selected locations on the fracture surface of the anode body exterior surface in a 2,000×field of view, and calculating the arithmetic mean of the measured thickness values across 50 randomly selected samples.

The second conductive polymer semiconductor layer 40 is a layer formed by adhering a conductive polymer dispersion, and then drying and solidifying the adhered dispersion, and contains at least a conductive polymer. By forming the second conductive polymer semiconductor layer 40 on the first conductive polymer semiconductor layer 30, an overall conductive polymer semiconductor layer having superior adhesion and good suppression of leakage current can be realized.

The density of the second conductive polymer semiconductor layer 40 is preferably higher than the density of the first conductive polymer semiconductor layer 30. The first conductive polymer semiconductor layer 30 is preferably formed using a chemical polymerization method and/or an electrolytic polymerization method, and tends to have a comparatively low density. In contrast, the second conductive polymer semiconductor layer 40 is formed by adhering a conductive polymer dispersion and then drying and solidifying the dispersion, and is therefore more likely to have a comparatively high density. By forming the first conductive polymer semiconductor layer 30 with a low density and the second conductive polymer semiconductor layer 40 with a high density, the adhesion to the dielectric layer can be enhanced, and short circuits and leakage current can be better suppressed. Further, by using a conductive polymer dispersion, the throughput for forming the second conductive polymer semiconductor layer 40 can be improved, enabling an improvement in productivity. The thickest portion of the second conductive polymer semiconductor layer 40 on the lower surface 40b is formed with a greater relative thickness than the average thickness of the first conductive polymer semiconductor layer on the lower surface 40b. By ensuring that the thickness of the thickest portion of the second conductive polymer semiconductor layer on the lower surface 40b is greater than the average thickness of the first conductive polymer semiconductor layer on the lower surface 40b, superior adhesion and good suppression of leakage current can be realized more effectively for the overall conductive polymer semiconductor layer.

The thickness of the second conductive polymer semiconductor layer 40 on the lower surface 40b is greater than 2 μm and less than 15 μm, is preferably from 4 to 11 μm, and is more preferably from 6 to 8 μm.

The thickness of the second conductive polymer semiconductor layer 40 on the side surfaces 40c is formed with increasing thickness from the upper surface side toward the lower surface side. The thickness of the thickest portion of the second conductive polymer semiconductor layer 40 on the lower surface 40b is thinner than the thickness of the thickest portion of the second conductive polymer semiconductor layer 40 on the side surfaces 40c. By ensuring that the second conductive polymer semiconductor layer 40 on the lower surface 40b has adequate thickness and is a densely packed layer, damage to the dielectric layer can be suppressed, and short circuits and leakage current within the solid electrolytic capacitor element can be suppressed.

Generally, the first conductive polymer semiconductor layer formed using a chemical polymerization method and/or an electrolytic polymerization method, and the second conductive polymer semiconductor layer formed by adhesion and subsequent solidification of a conductive polymer dispersion are both layers that have gaps large enough for gas to permeate through, meaning any hydrogen gas generated during chemical conversion can permeate through the layers. However, it is thought that if the conductive polymer semiconductor layer (the first conductive polymer semiconductor layer 30 and the second conductive polymer semiconductor layer 40, and particularly the second conductive polymer semiconductor layer 40 on the lower surface 40b) is not thin enough for the amount of hydrogen gas being generated, then the hydrogen gas is unable to escape (permeate through the interior of the conductive polymer semiconductor layer) at sufficient speed, resulting in cracking of the conductive polymer semiconductor layer. It is thought that because the second conductive polymer semiconductor layer 40 is formed with comparatively high density, it is particularly prone to cracking or splitting. Further, as described above, because the second conductive polymer semiconductor layer 40 is formed by adhering a conductive polymer dispersion, and then drying and solidifying the dispersion, the thickness on the lower surface 40b that represents the lower surface during the manufacturing process tends to be thicker compared with the other surfaces.

Accordingly, if the thickness of the second conductive polymer semiconductor layer 40 formed on the lower surface 40b can be controlled within the range mentioned above, then cracking and splitting of the second conductive polymer semiconductor layer 40 on the lower surface 40b, which has conventionally been the surface most prone to cracking and splitting, can be suppressed. As a result, even when a tungsten anode body is used, which tends to generate a larger amount of hydrogen gas than conventional anode bodies formed from tantalum or aluminum, cracking and splitting of the second conductive polymer semiconductor layer 40 on the lower surface 40b during post-conversion treatments can be suppressed. Provided the occurrence of cracking and splitting of the second conductive polymer semiconductor layer 40 can be suppressed, the leakage current in the solid electrolytic capacitor element 100 can also be suppressed.

The thickness of the second conductive polymer semiconductor layer can be confirmed by preparing a fractured surface sample of the solid electrolytic capacitor element 100, and inspecting a scanning electron microscope (SEM) image of a cross-section of the sample. The thickness of the second conductive polymer semiconductor layer 40 on the aforementioned lower surface 40b can be determined, for example, as the thickness of the thickest portion, by measuring the thickness of the thickest location in a 2,000×field of view, and calculating the arithmetic mean of a series of these measured thickness values across 50 randomly selected samples.

Further, the second conductive polymer semiconductor layer formed on the side surfaces 40c tends to be formed with increasing thickness from the side of the upper surface 40a toward the side of the lower surface 40b. As a result, measurement within a 2,000×field of view was performed at the lower end of the side surfaces 40c. This thickness d at the lower end was calculated as the length of a perpendicular line from the side surface 40c to an extended line drawn down from a side surface 30c of the first conductive polymer semiconductor layer. The side surface 30c of the first conductive polymer semiconductor layer has some unevenness, but the extended line of this side surface 30c is a vertical line (in a direction perpendicular to the upper surface 40a and the lower surface 40b) drawn from the tip of the most outwardly protruding portion of the first conductive polymer semiconductor layer.

The first conductive polymer semiconductor layer 30 and the second conductive polymer semiconductor layer 40 can be distinguished in an electron microscope image.

The conductor layer 50 may use a conventional layer. For example, a layer prepared by sequentially stacking a carbon layer and a silver layer or the like can be used.

Solid Electrolytic Capacitor

Figure 2:
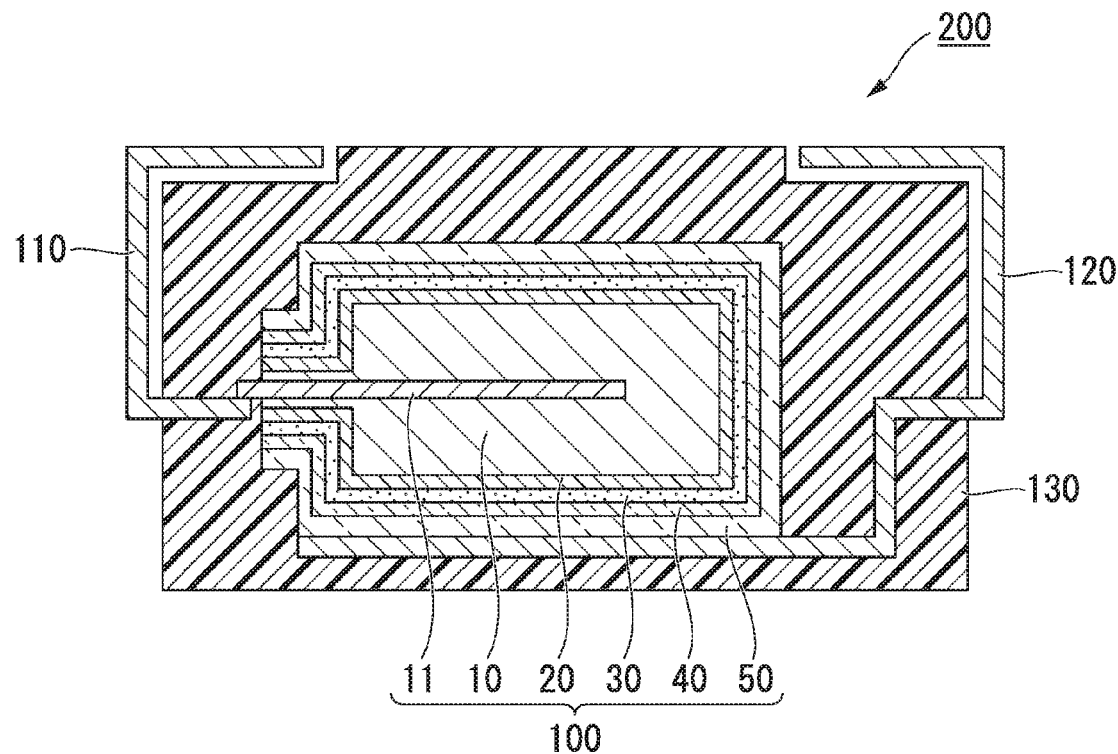
FIG. 2 is a schematic cross-sectional view schematically illustrating a solid electrolytic capacitor according to an embodiment of the present invention.

FIG. 2 is a schematic cross-sectional view schematically illustrating a solid electrolytic capacitor of the present invention. The solid electrolytic capacitor 200 includes the solid electrolytic capacitor element 100 described above. In other words, the dielectric layer 20, the first conductive polymer semiconductor layer 30, the second conductive polymer semiconductor layer 40 and the conductor layer 50 are formed, in that order, on the tungsten anode body 10, and within the second conductive polymer semiconductor layer 40, the thickness of the second conductive polymer semiconductor layer 40 on the lower surface opposite the upper surface from which the lead wire 11 protrudes is greater than 2 µm and less than 15 µm. Accordingly, the solid electrolytic capacitor 200 can suppress leakage current.

As illustrated in FIG. 2, the solid electrolytic capacitor 200 may have a structure in which the anode lead wire 11 of the solid electrolytic capacitor element 100 is connected to an anode terminal 110, the conductor layer 50 is connected to a cathode terminal 120, and the entire structure with the exception of portions of the anode terminal 110 and the cathode terminal 120 is then covered with a resin exterior coating 130. The conductor layer 50 and the cathode terminal 120 may also be connected via a conductive adhesive. By providing the resin exterior coating 130, the solid electrolytic capacitor element 100 can be protected from external effects. Further, a plurality of solid electrolytic capacitor elements may also be aligned in parallel to function as a single solid electrolytic capacitor.

Method for Manufacturing Solid Electrolytic Capacitor Element and Solid Electrolytic Capacitor A method for manufacturing a solid electrolytic capacitor element according to one aspect of the present invention is a method for manufacturing the solid electrolytic capacitor element described above, the method including a step of adhering a conductive polymer dispersion to the surface of the first conductive polymer semiconductor layer with the surface from which the lead wire protrudes disposed as the upper surface, a step of removing liquid accumulation of the adhered conductive polymer dispersion from the lower surface, and a step of solidifying the conductive polymer dispersion following removal of the liquid accumulation. As a result of this method, the thickness of the second conductive polymer semiconductor layer on the lower surface can be adjusted to a value that is greater than 2 µm and less than 15 µm.

First, the tungsten anode body is prepared. As described above, the tungsten anode body is an anode body that contains tungsten as the main component. At this point, the tungsten anode body is in a state prior to addition of a dielectric coating, and is composed of a lead wire added to a tungsten sintered body. The tungsten sintered body can be obtained by sintering and molding of a tungsten powder, and can be prepared by typically employed methods. The tungsten powder used in forming the tungsten sintered body can be prepared using the methods described above.

Next, the dielectric layer is formed on the surface of the tungsten anode body by a chemical conversion treatment. The chemical conversion treatment may employ typically used anodic oxidation methods, and is generally performed by dipping the tungsten anode body in an electrolyte solution and applying a voltage with the anode body acting as the anode. Examples of the electrolyte within the electrolyte solution include nitric acid, sulfuric acid and ammonium persulfate.

The end point for the chemical conversion treatment is typically determined by initiating the chemical conversion treatment at a specific current, and once the voltage has reached a preset chemical conversion voltage, continuing constant voltage treatment until the current falls to a prescribed value.

The first conductive polymer semiconductor layer is formed on the dielectric layer. The first conductive polymer semiconductor layer is preferably formed using a chemical polymerization method and/or an electrolytic polymerization method. By using a chemical polymerization method and/or an electrolytic polymerization method, the semiconductor is formed even on the inside of the fine pores in the capacitor anode body, thereby enabling the adhesion of the first conductive polymer semiconductor layer to the dielectric layer to be enhanced. The chemical polymerization method and/or the electrolytic polymerization method may use typical conventional methods. Further, these treatments may also be split into a plurality of steps.

There are no particular limitations on the solution used for forming the first conductive polymer semiconductor layer, provided it is a solution that can form a semiconductor when a current is passed through the solution, and examples include solutions containing aniline, thiophene, pyrrole, or substituted derivatives of these compounds (for example, 3,4-ethylenedioxythiophene) or the like. A dopant may also be added to the solution for forming the conductive polymer semiconductor layer. There are no particular limitations on this dopant, and examples include conventional dopants such as aryl sulfonic acids or salts thereof, alkyl sulfonic acids or salts thereof, and various polymeric sulfonic acids or salts thereof. By using this type of solution for forming the first conductive polymer semiconductor layer and passing a current through the solution, a first conductive polymer semiconductor layer formed from a conductive polymer (such as polyaniline, polythiophene, polypyrrole, polymethylpyrrole or a derivative of any of these polymers) can be formed on the dielectric layer.

Subsequently, the second conductive polymer semiconductor layer is formed on the first conductive polymer semiconductor layer. The second conductive polymer semiconductor layer is formed using the steps described below.

First, in a first step, the surface from which the lead wire protrudes is disposed as the upper surface, and a conductive polymer dispersion is adhered to the first conductive polymer semiconductor layer. The conductive polymer dispersion may use a typical commercially available dispersion. The solution used in forming the first conductive polymer semiconductor layer and this conductive polymer dispersion are preferably different from each other, and the conductive polymer dispersion preferably has a higher viscosity.

The adhesion may be performed by dipping the tungsten anode body on which the first conductive polymer semiconductor layer has been formed in the conductive polymer dispersion and then pulling the tungsten anode body up out of the dispersion, or by application of the conductive polymer dispersion. At this time, because the surface from which the lead wire protrudes is positioned as the upper surface, gravity causes the volume of liquid on the side surfaces to be greater at the lower surface side of the side surfaces, and also causes liquid accumulation to occur on the lower surface.

Next, in a second step, this liquid accumulation on the lower surface is removed. There are no particular limitations on the method used for removing the liquid accumulation, but the liquid accumulation is typically partially removed by bringing a blotting paper into contact with the liquid accumulation prior to drying the conductive polymer dispersion.

For example, a Kimwipes (registered trademark) wiper manufactured by Nippon Paper Industries Co., Ltd. can be used as the blotting paper. Other materials may also be used without any particular restrictions, provided they are capable of absorbing the conductive polymer dispersion, and examples of such other materials include papers, cloths, nonwoven fabrics, and plastic cloths and the like.

The thickness of the liquid accumulation of the second conductive polymer semiconductor layer can be controlled, for example, by adjusting the time for which the blotting paper is used to absorb a portion of the conductive polymer dispersion, and the type of blotting paper used. This blotting time differs depending on the type of blotting paper used, and therefore preliminary testing or the like is preferably performed to ascertain in advance the relationship between the type of blotting paper and the blotting time.

Finally, in a third step, the conductive polymer dispersion remaining following removal of the liquid accumulation is solidified. There are no particular limitations on the solidification method, and typically employed drying methods or the like may be used.

There are no particular limitations on the dispersion used for forming the second conductive polymer semiconductor layer, provided it is a solution that can form a semiconductor by the method described above, and examples include solutions containing aniline, thiophene, pyrrole, or substituted derivatives of these compounds (for example, 3,4-ethylenedioxythiophene) or the like. A dopant may also be added to the dispersion for forming the conductive polymer semiconductor layer. There are no particular limitations on this dopant, and examples include conventional dopants such as aryl sulfonic acids or salts thereof, alkyl sulfonic acids or salts thereof, and various polymeric sulfonic acids or salts thereof. By using this type of dispersion for forming a conductive polymer semiconductor layer and passing a current through the dispersion, a second conductive polymer semiconductor layer formed from a conductive polymer (such as polyaniline, polythiophene, polypyrrole, polymethylpyrrole or a derivative of any of these polymers) can be formed on the first conductive polymer semiconductor layer.

The second conductive polymer semiconductor layer may also be formed by repeating the above steps a plurality of times. When the steps are repeating a plurality of times, the liquid accumulation is preferably removed each time the first step is performed. Because it is thought that liquid accumulation occurs each time the first step is performed, removing the liquid accumulation formed each time the first step is performed can better suppress the thickness of the second conductive polymer semiconductor layer on the lower surface from becoming overly large.

In the above method, a post-conversion treatment is performed after formation of the first conductive polymer semiconductor layer and/or the second conductive polymer semiconductor layer. By performing a post-conversion treatment, any defects or the like in the dielectric layer can be repaired. This post-conversion treatment may be performed after formation of the first conductive polymer semiconductor layer and the second conductive polymer semiconductor layer, or in those cases where formation of the second conductive polymer semiconductor layer is performed via a plurality of repetitions, the post-conversion treatment may be performed after each repetition. The post-conversion treatment may also be performed after formation of the first conductive polymer semiconductor layer and before formation of the second conductive polymer semiconductor layer.

During formation of the dielectric layer and during post-conversion, an anode body containing tungsten as the main component generates a larger amount of hydrogen gas than an anode body containing aluminum or tantalum as the main component. This generated hydrogen gas permeates through the conductive polymer semiconductor layer (the first conductive polymer semiconductor layer and the second conductive polymer semiconductor layer) and is discharged externally, but if the amount of hydrogen gas generated is too large relative to the thickness of the conductive polymer semiconductor layer, then it can cause cracking and splitting of the conductive polymer semiconductor layer. Because the second conductive polymer semiconductor layer is formed with comparatively high density, it is particularly prone to cracking or splitting on the lower surface. However, in the method for manufacturing a solid electrolytic capacitor element according to the present invention, because the second conductive polymer semiconductor layer is formed using the method described above, the thickness of the second conductive polymer semiconductor layer on the lower surface can be controlled to a value that is greater than 2 µm and less than 15 µm, and therefore the occurrence of cracking and splitting of the second conductive polymer semiconductor layer can be suppressed.

Moreover, it is preferable that the thickness of the thickest portion of the second conductive polymer semiconductor layer on the lower surface is less than the thickness of the thickest portion of the second conductive polymer semiconductor layer on the side surfaces.

There are no particular limitations on the conductor layer, and the use of highly conductive carbon or silver or the like is common. There are also no particular limitations on the preparation method, and the conductor layer may be prepared by solidifying a paste of carbon or silver. Further, these types of materials may also be laminated.

Finally, by electrically connecting the anode lead wire of the thus obtained solid electrolytic capacitor element to an external anode terminal, electrically connecting the conductor layer to an external cathode terminal, and then covering the element with a resin exterior coating, a solid electrolytic capacitor can be obtained.

[Examples]

The present invention is described below in more detail based on a series of examples, but the present invention is in no way limited by these examples.

Unless specifically stated otherwise, the volume average particle size values of the tungsten powders used in the examples and comparative examples were measured using the method described below.

The volume average particle size was measured by using an HRA9320-X100 apparatus manufactured by Microtrac Corporation to measure the particle size distribution using a laser diffraction/scattering method, and then measuring the particle size values at those points where the cumulative volume % corresponded with 10 volume %, 50 volume % and 90 volume % (D10, D50 and D90 (µm) respectively). The D50 value was used as the volume average particle size (50% particle size).

EXAMPLES

Example 1

First, a silicon powder (D50 of 1 µm, D10 of 0.2 µm, and D90 of 12 µm) was mixed with a tungsten powder having a 50% particle size of 0.2 µm obtained by a hydrogen reduction of tungsten trioxide, and the mixture was calcined under vacuum at 1,120° C. for 30 minutes. After returning the mixture to room temperature, the lumps were removed, crushed, and then classified by sieving to obtain a granulated powder with a particle size of 26 to 180 µm. Subsequently, 10% by mass of the above tungsten powder prior to calcination was added to the granulated powder to prepare a mixed powder (D50 of 75 µm, D10 of 0.3 µm, and D90 of 125 µm). This mixed powder was molded and then sintered under vacuum at 1,320° C. for 20 minutes to prepare 1,000 tungsten anode bodies each having a size of 1.0 ×1.7 ×2.3 mm (with a tantalum wire having a diameter of 0.24 mm implanted in the 1.0 ×2.3 mm surface, and having a mass of 32 mg±2 mg).

Next, the procedure described below was used to form a dielectric layer, a first conductive polymer semiconductor layer, a second conductive polymer semiconductor layer, and a conductor layer.

First, the dielectric layer was formed. The dielectric layer was formed by dipping the tungsten anode body (including a portion of the lead wire) in a 3% by mass aqueous solution of ammonium persulfate at 50° C., and performing an anodic chemical conversion treatment for 5 hours at 10 V at a maximum current of 2 mA per single anode body.

Subsequently, the first conductive polymer semiconductor layer was formed in the manner described below.

The tungsten anode body with the dielectric layer formed thereon was subjected to three repetitions of a process which included dipping the anode body in a 10% by mass ethanol solution of 3,4-ethylenedioxythiophene, drying the anode body, and then dipping the anode body in a separately prepared 10% by mass aqueous solution of iron toluenesulfonate and performing a reaction at 60° C.

The anode body was then dipped in a 10% by mass ethanol solution of 3,4-ethylenedioxythiophene.

Subsequently, the tungsten anode body was placed in a separately prepared solution containing 70 parts of water which had been supersaturated with 3,4-ethylenedioxythiophene and in which 3% by mass of anthraquinone sulfonic acid had been dissolved and 30 parts of ethylene glycol, and with the anode body acting as the positive electrode and a stainless steel plate disposed in the solution acting as the negative electrode, an electrolytic polymerization was performed at room temperature for 60 minutes by passing a current through the system via the lead wire of the anode body under conditions including a current of 60 µA per anode body. Subsequently, the anode body was washed with water, washed with ethanol, and then dried at 125° C. Then, using the chemical conversion solution described above, a post-conversion treatment was performed at room temperature, at 4 V for a period of 15 minutes, using a current of 0.5 mA per anode body.

The above series of operations including the electrolytic polymerization, washing and then the post-conversion treatment was repeated a further three times (for a total of four repetitions). The current per anode body during these electrolytic polymerization steps was 60 µA for the first and second repetitions, and 70 µA for the third and fourth repetitions. This procedure was used to form the first conductive polymer semiconductor layer. The thickness of the anode body outer surface layer composed of this first conductive polymer semiconductor layer formed from poly (3,4-ethylenedioxythiophene) was found to be substantially uniform on the side surfaces and the lower surface when observed with an electron microscope, with the average thickness confirmed as 2 µm.

The second conductive polymer semiconductor layer was then formed in the manner described below. The tungsten anode body with the layers up to and including the first conductive polymer semiconductor layer formed thereon was dipped into, and then pulled out from, a conductive polymer dispersion (product name: DEPW1, manufactured by Tomiyama Pure Chemical Industries, Ltd., an aqueous dispersion of poly(3,4-ethylenedioxythiophene)). Then, before the liquid adhered to the six surfaces of the tungsten anode body was dried, a separately prepared Kimwipe was pressed lightly for two seconds against the surface opposite the surface in which the lead wire was implanted (namely, the lower surface), thereby blotting and absorbing the liquid accumulation on the lower surface. Subsequently, the anode body was dried at 105° C. for 20 minutes, thereby solidifying the dispersion adhered to the six surfaces. This series of operations including adhesion, absorption and drying was repeated a further two times (for a total of three repetitions), and then a post-conversion treatment, washing and drying were performed in the same manner as that described in the formation steps for the first conductive polymer semiconductor layer. An additional three repetitions of the series of operations including adhesion of the dispersion, absorption and solidification were then performed, and then the post-conversion treatment, washing and drying were once again performed, thus forming a second conductive polymer semiconductor layer formed from poly(3,4-ethylenedioxythiophene). The thickness of the second conductive polymer semiconductor layer on the surface opposite the surface in which the lead wire was implanted (namely, the lower surface) was measured by electron microscope observation of a fractured cross-section, and was found to be 8 µm. The thickness of the second conductive polymer semiconductor layer on those surfaces orthogonal to the surface in which the lead wire was implanted (namely, the side surfaces) was found to be thinner near the upper surface, and increase gradually toward the lower surface, albeit not in a totally uniform manner. The thickness of the thickest portion was 12 µm.

Subsequently, a conductor layer was formed on each tungsten anode body having the second conductive polymer semiconductor layer formed thereon, with the exception of the surface in which the lead wire was implanted, by sequentially laminating a carbon layer and then a silver layer formed by solidification of a silver paste, thus completing production of 64 solid electrolytic capacitor elements. The capacitance of these solid electrolytic capacitor elements at a bias voltage of 2 V and 120 Hz was 360 µf and the LC at 2.5 V was 7 µA (average values across all 64 elements).

Examples 2 to 5 and Comparative Example 1

With the exception of altering the number of repetitions of the dispersion solidification step during formation of the second conductive polymer semiconductor layer in Example 1 (namely, increasing or decreasing the number of solidification steps performed in the second round of operations to alter the total number of solidification repetitions, for example three repetitions of the solidification step in the first round of operations and then two repetitions of the solidification step in the second round of operations in the case of Example 2), solid electrolytic capacitor elements were manufactured in the same manner as Example 1.

Comparative Example 2

With the exception of not forming the second conductive polymer semiconductor layer, solid electrolytic capacitor elements were manufactured in the same manner as Example 1.

Reference Example 1

Reference Example 1 differs from Comparative Example 1 in that a tantalum sintered body was used as the capacitor anode body.

More specifically, a molded body was prepared using a commercially available tantalum powder having a CV value of 100,000 μF·V/g as the mixed powder, and the molded body was sintered at 1,360° C. The mass of the anode body excluding the lead wire was 20±2 mg.

Comparative Examples 3 and 4

With the exception of not performing blotting and absorption of the dispersion in Example 1 and Example 2, capacitors were prepared in the same manner as Example 1 and Example 2. Cracking was confirmed visually in the conductive polymer semiconductor layer on the lower surface.

40: Second conductive polymer semiconductor layer
40a: Upper surface
40b: Lower surface
40c: Side surface
50: Conductor layer
100: Solid electrolytic capacitor element
110: Anode terminal
120: Cathode terminal
130: Resin exterior coating
200: Solid electrolytic capacitor

What is claimed is:

1. A solid electrolytic capacitor element comprising a dielectric layer, a first conductive polymer semiconductor layer, a second conductive polymer semiconductor layer and a conductor layer, formed in that order, on an anode body containing tungsten as a main component and having a protruding lead wire, wherein
a thickness of a thickest portion of the second conductive polymer semiconductor layer on a lower surface opposite an upper surface from which the lead wire protrudes is thinner than a thickness of a thickest portion of the second conductive polymer semiconductor layer on a side surface, and
a thickness of the second conductive polymer semiconductor layer on the lower surface is in a range from 2 μm to 11 μm.

TABLE 1

| | Main component of anode body | Solidification repetitions (number) | Liquid accumulation removal step | Leakage current (μA) | Thickness of second conductive polymer semiconductor layer (lower surface) (μm) | Thickness of second conductive polymer semiconductor layer (side surfaces) (μm) | Blotting time (seconds) × (repetitions) |
|---|---|---|---|---|---|---|---|
| Example 1 | tungsten | 6 | yes | 7 | 8 | 12 | 2 seconds × 6 repetitions |
| Example 2 | tungsten | 5 | yes | 10 | 7 | 11 | 2 seconds × 5 repetitions |
| Example 3 | tungsten | 4 | yes | 18 | 4 | 10 | 2 seconds × 4 repetitions |
| Example 4 | tungsten | 7 | yes | 24 | 11 | 12 | 2 seconds × 7 repetitions |
| Comparative Example 1 | tungsten | 8 | yes | 75 | 15 | 16 | 2 seconds × 8 repetitions |
| Comparative Example 2 | tungsten | 0 | — | 78 | — | — | — |
| Comparative Example 3 | tungsten | 6 | no | 710 | 42 | 17 | — |
| Comparative Example 4 | tungsten | 5 | no | 528 | 33 | 16 | — |
| Reference Example 1 | tantalum | 4 | no | 8 | 15 | 15 | — |

INDUSTRIAL APPLICABILITY

The capacitor element of the present invention is ideal for use as a solid electrolytic capacitor in a wide variety of fields, including in mobile telephones, personal computers and the like.

DESCRIPTION OF THE REFERENCE SIGNS

10: Tungsten anode body
11: Lead wire
12: Tungsten powder particles
20: Dielectric layer
30: First conductive polymer semiconductor layer 2. The solid electrolytic capacitor element according to claim 1, wherein the thickness of the thickest portion of the second conductive polymer semiconductor layer on the lower surface is thicker than an average thickness of the first conductive polymer semiconductor layer on the lower surface.

3. A solid electrolytic capacitor comprising:
the solid electrolytic capacitor element according to claim 1;
an anode terminal connected to the protruding lead wire;
a cathode terminal connected to the conductor layer; and a resin exterior coating covering a part of the anode terminal and a part of the cathode terminal.

4. A solid electrolytic capacitor comprising:
the solid electrolytic capacitor element according to claim 2;
an anode terminal connected to the protruding lead wire;
a cathode terminal connected to the conductor layer; and
a resin exterior coating covering a part of the anode terminal and a part of the cathode terminal.

5. A method for manufacturing the solid electrolytic capacitor element according to claim 1,
wherein a formation for the second conductive polymer semiconductor layer comprises:
adhering a conductive polymer dispersion to a surface of the first conductive polymer semiconductor layer, with a surface from which the lead wire protrudes disposed as the upper surface,
removing liquid accumulation of the adhered conductive polymer dispersion generated on the lower surface opposite the upper surface from which the lead wire protrudes, and
solidifying the conductive polymer dispersion from which the liquid accumulation is removed.

6. The method for manufacturing the solid electrolytic capacitor element according to claim 5, wherein the first conductive polymer semiconductor layer is formed by using a chemical polymerization method and/or an electrolytic polymerization method.

* * * * *